United States Patent [19]

Yanase

[11] Patent Number: 5,754,102

[45] Date of Patent: May 19, 1998

[54] APPARATUS FOR ALARMING OF TIRE DEFLATION

[75] Inventor: Minao Yanase, Kobe, Japan

[73] Assignees: Sumitomo Rubber Industries, Ltd., Hyogo-ken; Sumitomo Electric Industries, Ltd., Osaka-fu, both of Japan

[21] Appl. No.: 821,577

[22] Filed: Mar. 18, 1997

Related U.S. Application Data

[63] Continuation of Ser. No. 518,887, Aug. 24, 1995, abandoned, which is a continuation-in-part of Ser. No. 346,220, Nov. 22, 1994, abandoned.

[30] Foreign Application Priority Data

Dec. 10, 1993 [JP] Japan ................................. 5-310275

[51] Int. Cl.⁶ ........................................................ B60C 23/00
[52] U.S. Cl. ............................ 340/442; 340/438; 340/443; 340/444; 73/146.5

[56] References Cited

U.S. PATENT DOCUMENTS

| | | | |
|---|---|---|---|
| 4,131,876 | 12/1978 | Dees, Sr. et al. | 340/442 |
| 4,785,280 | 11/1988 | Fubini | 340/438 |
| 4,876,528 | 10/1989 | Walker et al. | 340/442 |
| 5,218,862 | 6/1993 | Hurrell, II et al. | 340/444 |
| 5,345,217 | 9/1994 | Prottey | 340/444 |
| 5,349,328 | 9/1994 | Lonzame | 340/444 |
| 5,491,465 | 2/1996 | Adams | 340/442 |

FOREIGN PATENT DOCUMENTS

| | | |
|---|---|---|
| 36755 | 9/1981 | European Pat. Off. . |
| 221522 | 5/1987 | European Pat. Off. . |
| 239545 | 9/1987 | European Pat. Off. . |
| 284895 | 10/1988 | European Pat. Off. . |
| 2313219 | 12/1976 | France . |
| 2850787 | 6/1980 | Germany . |
| 57-24837 | 5/1982 | Japan . |
| 86/07316 | 12/1986 | WIPO . |

*Primary Examiner*—Jeffery Hofsass
*Assistant Examiner*—Davetta Woods

[57] ABSTRACT

An apparatus for alarming of tire deflation is provided in which reliability of an alarm is raised by a manner of alarming slightly when tire deflation is small and detection accuracy of a deflation detection mechanism is small, while alarming largely when tire deflation is large and deflation is detected with large accuracy. The apparatus comprises deflation detection means for detecting tire deflation; vehicle speed detection means for detecting a speed of a vehicle; and alarm means for deciding an alarm level depending on a detected tire deflation and a detected vehicle speed, and providing an alarm at the decided alarm level.

5 Claims, 2 Drawing Sheets

APPARATUS FOR ALARMING OF TIRE DEFLATION

CROSS-REFERENCE TO RELATED APPLICATION

This application is a continuation of application Ser. No. 08/518,887 filed on Aug. 24, 1995, now abandoned, which is a continuation-in-part of application Ser. No. 08/346,220 filed on Nov. 22, 1994, now abandoned.

BACKGROUND OF THE INVENTION

The present invention relates to an apparatus for alarming of tire deflation and, more particularly, to an apparatus for alarming of tire deflation in which, in order to raise reliability of an alarm occurrence, an alarm is given slightly when detection accuracy of a mechanism for detecting tire deflation is low while the alarm is given largely when detection accuracy becomes higher with an advance of deflation. Furthermore, taking it into consideration that critical speeds to cause a burst differ from each other depending upon a degree of tire deflation, the present invention relates to an apparatus for alarming of tire deflation in which the alarm is given larger according to an increase in a vehicle speed.

Safe and comfortable travel can be provided by keeping pressures of tires on a vehicle at values indicated to each vehicle. However, deflation of a tire occurs occasionally from an external damage of the tire and an incomplete maintenance, which would seriously influence safety as well as comfortableness of driving. So, various kinds of apparatuses for detecting tire deflation and alarming a driver have been devised and marketed, but the apparatuses have not yet spread widely because of a difficulty in a compatibility of cost and reliability.

In particular, with respect to timing for an alarm and reliability thereof, there exists a problem that it is very difficult to determine how far deflation should proceed before an alarm is given, since a dangerous degree of deflation depends on a vehicle speed. In other words, if the alarm is scheduled to be given at a small degree of deflation, there is a large merit in respect of sure security of safety. Slight deflation is, however, difficult to detect and an easy alarm occurrence causes driver uneasiness and repeated easy alarm occurrences have a possibility that a driver passes over the very alarm in the truly dangerous case. On the other hand, if the alarm is scheduled not to be given until deflation proceeds significantly to be detected with certainty, reliability of the alarm becomes large while there exists a problem that the alarm would get too late in the case of a high speed driving.

In view of the foregoing, it is an object of the present invention to provide an apparatus for alarming of tire deflation in which reliability of an alarm is raised by a manner of alarming slightly when tire deflation is small and detection accuracy of a mechanism of detecting deflation is low, while alarming largely when the tire deflation becomes large and is detected with high accuracy.

In addition, it is also an object of the present invention to provide a reliable apparatus for alarming of tire deflation in which, by operating an alarm mechanism with a vehicle speed measuring device and alarming more largely with an increase of vehicle speed, a balance is well kept between an alarm level and a danger of a real nature and a balance is well kept accuracy of an alarm, a degree of emergency of the alarm and uneasiness given to a driver by the alarm.

SUMMARY OF THE INVENTION

In accordance with the present invention, there is provided an apparatus for alarming of tire deflation comprising deflation detection means for detecting tire deflation; vehicle speed detection means for detecting a speed of a vehicle; and alarm means for deciding an alarm level depending on a detected tire deflation and a detected vehicle speed, and providing an alarm at the decided alarm level.

The apparatus for alarming of tire deflation of the present invention does not alarm unconditionally when a tire reaches to a particular deflation, but alarms depending on a degree of deflation in accordance with accuracy of a deflation detection mechanism. The apparatus alarms according to a level of a vehicle speed since critical speeds at which a tire might cause a burst differ from each other.

For example, in the case of an alarm device using a sound, the higher a level of deflation becomes, the louder sound the device alarms under a constant speed, while the higher a level of a vehicle speed becomes, the louder sound the device alarms under a constant level of deflation.

DETAILED DESCRIPTION

An apparatus for alarming tire deflation of the present invention will be explained with reference to the attached drawing.

Figure 1:
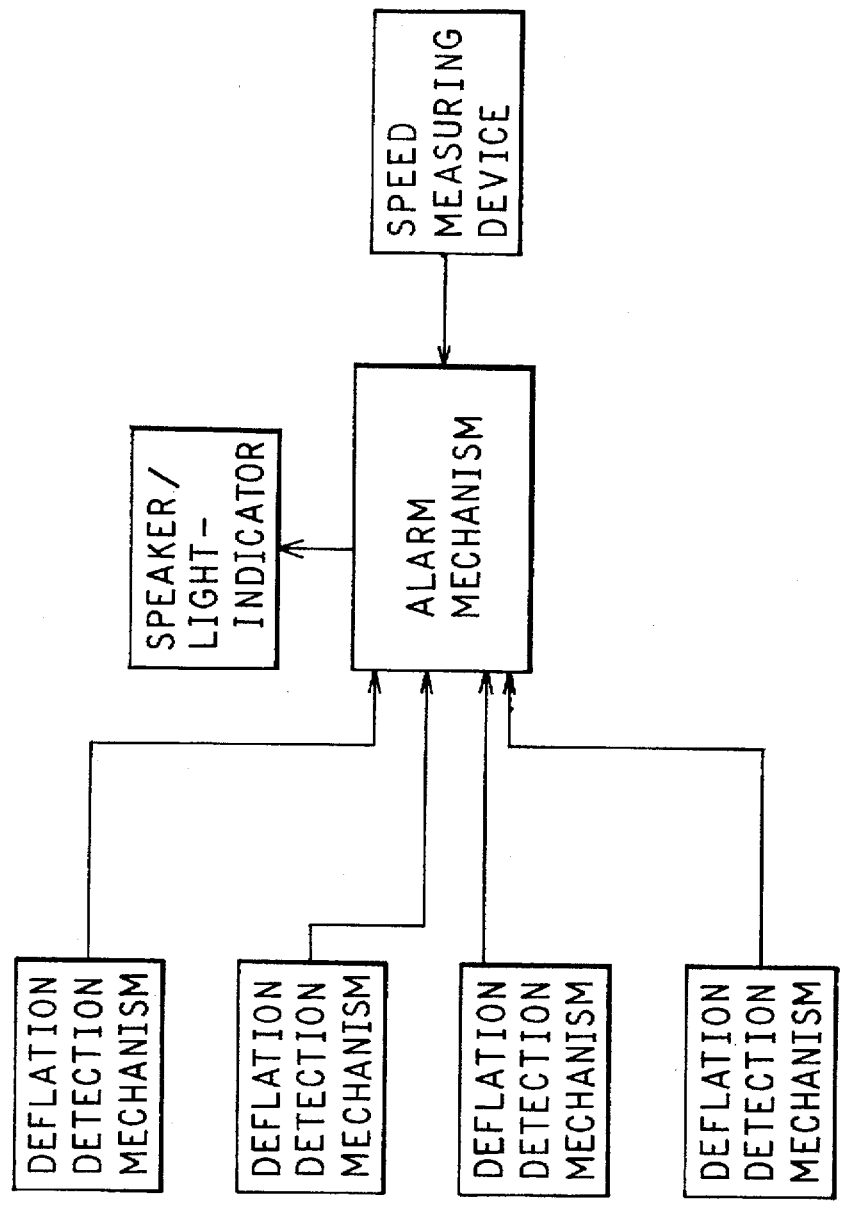
FIG. 1 is a representation of an embodiment of an apparatus for alarming of tire deflation of the present invention.

FIG. 1 is a representation of an embodiment of an apparatus for alarming of tire deflation of the present invention. As shown in FIG. 1, the apparatus of the present invention comprises four deflation detection mechanisms 1 for measuring tire deflation, a speed measuring device 2 for detecting a speed of a vehicle, an alarm mechanism 3 for deciding an alarm level and a speaker/light-indicator 4. A deflation detection mechanism 1 is provided on each wheel of the vehicle.

As for a deflation detection mechanism for measuring tire deflation, there are two types of detecting tire pressure directly and indirectly. As the type of detecting directly, there has been known, for example, a mechanism wherein a pressure sensor capable of generating a signal in proportion to a tire pressure is embedded in a tire wheel to transmit the signal to a vehicle body in the form of radio wave or with the use of electromagnetic induction. On the other hand, in the type of detecting indirectly, there is detected other physical quantity than tire pressure which varies in proportion to change of tire pressure. For example, there can be detected a load radius (distance between a road surface and a center of a tire) by means of a non-contact displacement gauge; a difference in tire rotational speed between a normal pressure tire and a deflated tire by means of a rotational pulse generator or tachometer; a bulge or rising of a sidewall of a tire by means of a non-contact displacement gauge; and a resonance frequency of a tire by means of an acceleration sensor. The measured values are changed into electrical signals which are transmitted to a vehicle body in the form of radio wave or with the use of electromagnetic induction.

Since the type of detecting directly is, however, so complicated in a mechanism, that it is liable to be expensive. On the other hand, the type of detecting indirectly can produce a system very economically by utilizing, for example, an ABS sensor equipped to a vehicle. It is, therefore, preferable to use the latter indirect detection type.

As for a speed measuring device 2, there can be used a speed indicator of a vehicle, a wheel speed sensor attached to ABS, or a non-contact laser speedmeter.

Figure 2:
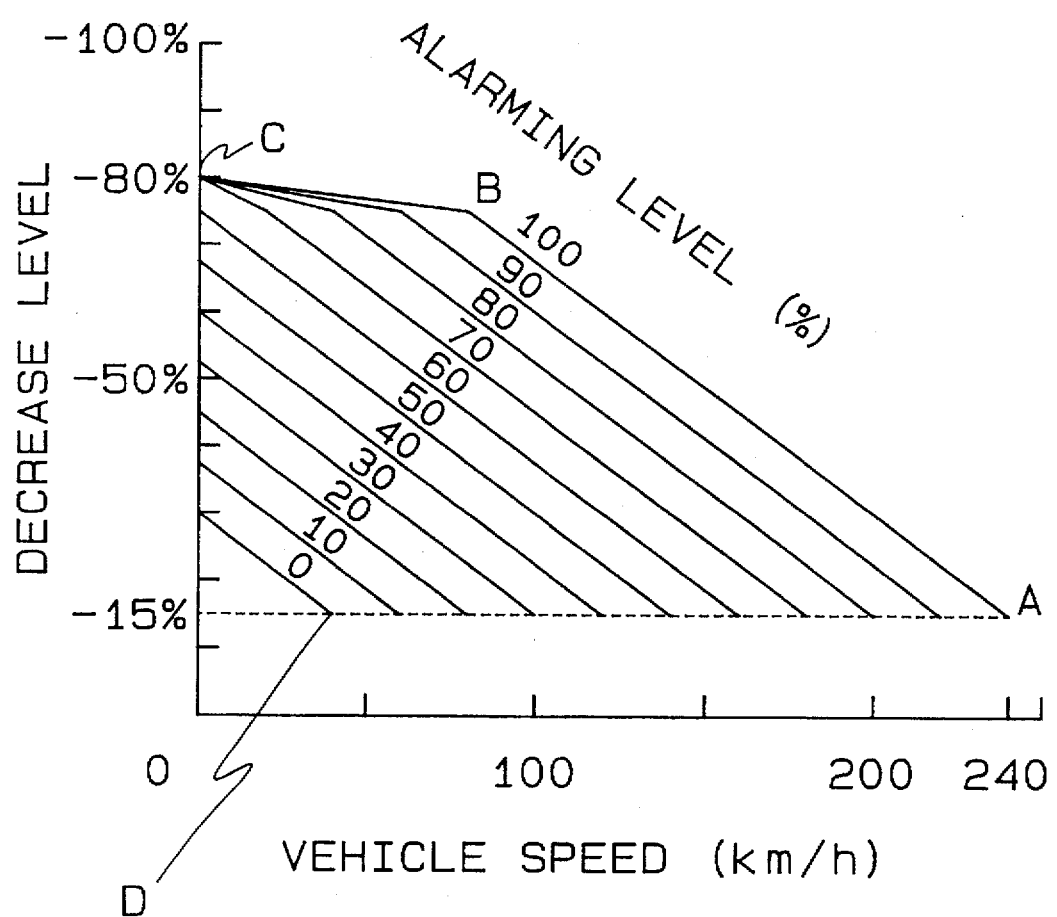
FIG. 2 is a representation of an example of alarm level in an apparatus for alarming of tire deflation of the present invention, which shows a relationship between vehicle speed and deflation level, and alarm level.

The alarm mechanism 3 includes, an arithmetic and logic unit (microcomputer) and a table which is prepared beforehand, an example thereof is shown in FIG. 2 mentioned below.

Based on a signal from the deflation detection mechanism 1 which is proportional to a tire deflation, the arithmetic and logic unit calculates a tire deflation level. Simultaneously, the arithmetic and logic unit decides a vehicle speed based on a signal from the speed measuring device 2.

Based on the obtained vehicle speed and tire deflation level, the arithmetic and logic unit then decides an alarm level in accordance with the table in the alarm mechanism 3 and transmits a signal in proportion to the decided alarm level to the speaker/light-indicator 4.

FIG. 2 is a representation of an example of alarm level for alarming tire deflation of the present invention, which shows a relationship between vehicle speed level and deflation, and alarm level. In the present specification, "deflation level" means a percentage of a deflated portion to a total normal pressure of a tire, and "alarm level" means a level of emergency perceived to a man, for example, a level of a loudness of a sound in the case of an alarm using a sound.

As shown in FIG. 2, in an apparatus for alarming tire deflation of the present invention, an alarm level becomes higher with increase of a deflation level under a constant vehicle speed, while the alarm level becomes higher with increase of a vehicle speed increases under a constant deflation level. A method for determining an alarm level in FIG. 2 is explained as follows.

A line of 100% of an alarm level is decided as a critical line for a tire to cause a burst. When the alarm level exceeds a line of 100%, it is not strange for a tire to cause a burst any time.

A lower limit of detection, which is not particularly limited in the present invention, is usually set at −15% (deflation of 0.3 kg/cm$^2$ in the case of normal pressure of 2 kg/cm$^2$). To measure deflation smaller than 15% deflation is difficult and lowers detection precision (detection accuracy) since pressure and rotational frequency of a tire fluctuates under the influence of a temperature, an applying condition, precision on pressure control of the tire and so on. Further, detection of such small deflation is meaningless, taking it into consideration that such small deflation scarcely becomes a problem in so far as safety.

However, even if the deflation level is only about −15%, a tire generates heat when a vehicle speed increases, and the tire is in danger of causing a burst when the vehicle speed exceeds 240 km/h. Therefore, a point on a segment corresponding to an alarm level of 100% is firstly plotted against a critical speed of 240 km/h at a detection lower limit for deflation, i.e. −15%. This is regarded as a point A. Secondly, if the deflation level is −75% (deflation of 1.5 kg/cm$^2$ in the case of normal pressure of 2 kg/cm$^2$), the tire is in danger of causing a burst when the vehicle speed exceeds 80 km/h. This is regarded as a point B. Thirdly, if the deflation level exceeds −80%, since the tire is much in danger of causing a burst and departure from a rim and an alarm is required to be given as soon as possible, the alarm level is set at 100% at a vehicle speed of 0 km/h. The point of an alarm level of −80% at the vehicle speed of 0 km/h is regarded as a point C, then this point C is connected to the point B and further connected to the point of A. This is regarded as a segment indicating the alarm level of 100%. This is the minimum line to maintain safety.

Next, lines which decrease 10 by 10% in an alarm level are drawn on the basis of the segment AB corresponding to the alarm level of 100%. At this time, the point D corresponding to a deflation level of −15% and a vehicle speed of 40 km/h is regarded as a point of an alarm level of 0%, and the segment from the point A to the point D is divided into 10 parts, and then segments are drawn from each dividing point parallel to the segment AB. Because a tire is not in danger of causing a burst under a vehicle speed of not more than 40 km/h in the case of a deflation level of −15%, and therefore the alarm level becomes 0%. Alarm levels of the segments are set at 90%, 80% ..., in turn from the nearest to the segment AB.

The operation of an apparatus for alarming of tire deflation of the present invention is explained subsequently. For example, let it be supposed that air pressure began to decrease because of some accident when driving the vehicle at a constant speed of 80 km/h on an expressway. At first, when a deflation level is between 0 and −15%, an alarm is not given, because the risk of causing a burst does not exist for such deflation as long as a vehicle speed is not so high, and because there are some cases where deflation does not occur actually since detection accuracy of deflation detection mechanism is low to such a degree of the deflation.

When the deflation level reaches −15%, the alarm level becomes abruptly 20% because of driving at a high speed of 80 km/h. The alarm begins, however, to sound softly since the detection accuracy is not yet so high. As the deflation level gradually becomes higher and the detection accuracy also becomes higher, the alarm level also becomes higher. The volume of the alarm increases in the way that the alarm level becomes 40% and 80% respectively when the deflation level becomes −30% and −60%. At last, when the deflation level reaches to −75% (air pressure of only 0.5 kg/cm$^2$ remaining in the case of normal air pressure of 2 kg/cm$^2$), the alarm level becomes 100% and the volume is the largest and the urgency given to a driver reaches the highest. So, the driver can immediately slow down the vehicle speed or so, and occasionally can act for avoiding a danger, for example, stop driving to wait for a maintenance service.

When the deflation level is −30% (air pressure of 1.4 kg/cm$^2$ in the case of normal air pressure of 2 kg/cm$^2$), the alarm level is 0% at a vehicle speed of 0 km/h but increases gradually according to the increase in the vehicle speed. Then, the alarm level becomes 20%, 40%, 60% and 100% respectively when the vehicle speed becomes 40 km/h, 80 km/h, 120 km/h and 200 km/h. So, the driver can avoid a danger beforehand, since the driver can follow the volume of the alarm, continue to drive at a vehicle speed of around 40 km/h with a smaller volume of the alarm and find a gasoline station or so to have an air pressure check.

Though the alarm level is presented by the magnitude of volume (loudness) in the above explanation, since the alarm level is a magnitude of an impact given to a driver, the way of alarming in the present invention is not particularly limited. That is, the alarm level can be presented by an interval of voices as well as a volume when the alarm is given in a voice, and by a variation of brightness or color of a lamp and by frequency of on-and-off when an on-and-off lamp is utilized, and the combinations of these are also available.

As has been described, since the alarm level is set depending upon detection accuracy of the deflation detection mechanism in the tire deflation alarm apparatus of the present invention, a driver can correctly avoid a danger as required without unnecessarily feeling uneasy.

Since critical speeds for causing a burst differ from each other depending upon the deflation levels, the alarm level is, by measuring both a deflation level and a vehicle speed, set higher with the increase in the deflation level in the case of a constant vehicle speed, or with the increase in the vehicle speed in the case of a constant deflation level. Since the alarm is well timed to a degree of a danger in a real drive, the driver can correctly decide whether to slow down or stop immediately. Thus, the apparatus can alarm with high reliablity without giving the driver unnecessary unease.

While only certain presently preferred embodiments have been described in detail, as will be apparent with those familiar with the art, certain changes and modifications can be made without departing from the spirit and scope of the invention as defined by the following claims.

What is claimed is:

1. An apparatus for alarming of tire deflation, comprising:

deflation detection means for detecting tire deflation;

vehicle speed detection means for detecting speed of a vehicle; and alarm means for selecting an alarm level from a table of alarm levels having different magnitudes, said selected alarm level depending on a detected tire deflation and a detected vehicle speed, and providing an alarm having a magnitude proportional to said selected alarm level to include, under a constant level of deflation, a greater magnitude of alarm proportional to a greater magnitude of the detected vehicle speed.

2. The apparatus according to claim 1 wherein the alarm means includes an arithmetic processing means in which is provided the table of alarm levels showing a relationship between vehicle speed level and tire deflation.

3. The apparatus according to claim 2 wherein said arithmetic processing means selects the alarm level by calculating a tire deflation level based on a signal from the deflation detection means and a vehicle speed based on a signal from the vehicle speed detection means and comparing said calculated tire deflation level and calculated vehicle speed to the table of alarm levels.

4. The apparatus according to claim 1 wherein said alarm means includes an alarm mechanism which indicates alarm by generating signals to a sound generator.

5. The apparatus according to claim 1 wherein said alarm means includes an alarm mechanism which indicates alarm by generating signals to a light generator.

* * * * *